Figure 1:
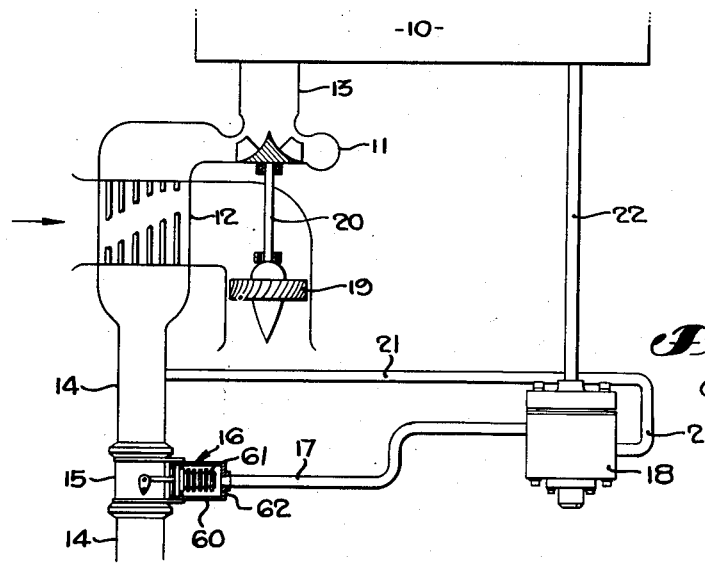

Nov. 18, 1952 R. A. FISCHER 2,618,125
PRESSURE RATIO VALVE FOR AIRCRAFT AIR CONDITIONING SYSTEMS
Filed May 3, 1949

INVENTOR.
RICHARD A. FISCHER
BY John H. Wallace

Patented Nov. 18, 1952

2,618,125

UNITED STATES PATENT OFFICE 2,618,125

PRESSURE RATIO VALVE FOR AIRCRAFT AIR CONDITIONING SYSTEMS

Richard A. Fischer, Los Angeles, Calif., assignor to The Garrett Corporation, Los Angeles, Calif., a corporation of California Application May 3, 1949, Serial No. 91,091

13 Claims. (Cl. 62—2)

This invention relates generally to pressure control apparatus, and particularly to apparatus for the control of the pressure ratios which may exist across the inlet and outlet of elastic fluid devices such as the fluid expansion turbines utilized in the air conditioning of aircraft.

The use of air or other gaseous media in expansion devices is well known in the refrigeration and air conditioning art, and of recent years, the air expansion turbine has been highly developed for that purpose in aircraft. Such turbines may not only constitute a source of cooling or refrigeration, but also may serve to recover some of the power expended in the initial compression of the air or other gaseous media.

Due to the rigid limitations placed on the size and weight of aircraft components, the various performance requirements of such apparatus can be attained only by the use of high speeds. Consequently, aircraft refrigeration units are usually operated at speeds which approach only too closely their maximum permissible speed. Accordingly, it is frequently desirable to provide means for preventing overspeeding of the expansion turbines or other engines which form a part of such units.

While pressure ratio controls have been associated for some time with the various types of aircraft compressors, the need of such controls for refrigeration units has arisen but comparatively recently as a result of the rapid advances in jet engine design. When the present air conditioning units were developed for use with jet engine power plants, the designed maximum speeds and pressure ratios included a considerable factor of safety to allow for advances in engine design. The latter has advanced so rapidly as to now encroach upon the originally designed safety factors of these air expansion turbine units. In anticipation of such engine design advance, high pressure ratio turbines with greatly increased speeds are now in the progress of development. In the meantime, however, it is necessary to protect the units now being manufactured and supplied when used with these higher performance engines.

An object of this invention, therefore, is to provide a pressure ratio control valve which will enable the use of presently manufactured refrigeration units in conjunction with high performance jet engines and compressors.

Another object is to provide a device of the character described which may be easily and quickly installed in an existing system to enable the continued use of a refrigeration unit where new and higher performance engines and other apparatus have replaced the older, lower performance units.

A further object of this invention is to provide a pressure ratio control valve and associated system which is light in weight and has a minimum of moving parts.

A still further object of this invention is to provide a pressure ratio control valve of the class described which is quickly and easily adjustable to maintain a desired pressure ratio between refrigeration unit inlet and outlet pressures under the various performance requirements which may be established in any particular airplane.

Figure 2:
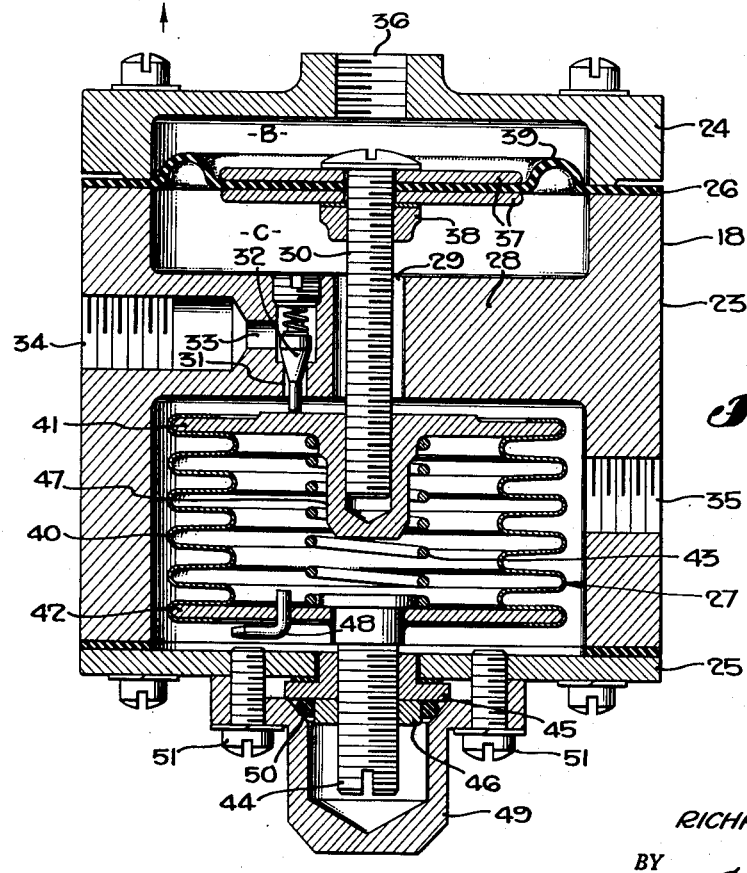

The above and other objects and advantages of this invention will be more readily apparent from the following description when read in connection with the accompanying drawings, in which:

Fig. 1 is a diagrammatic layout of an aircraft air conditioning system in which this invention is used, and Fig. 2 is an elevation in cross-section of my invention showing the various parts thereof.

Referring to Fig. 1, an air conditioned aircraft cabin, or other like enclosure, is indicated by the numeral 10. Cooling turbine 11 is supplied with compressed air through the heat exchanger 12 and discharges expanded and cooled air to cabin 10 through conduit 13. The compressed air from a jet engine compressor, or other source of compressed air (not shown), flows into heat exchanger 12 through a conduit 14 which includes a flow valve 15 which may be of the butterfly type or any other type suitable for the purpose. This valve is spring-loaded so as to tend to maintain itself in an open position and is operated by a suitable pneumatic actuator 16 which receives its motivating air through conduit 17 from pressure ratio control valve 18.

The pneumatic actuator 16 may be connected to the valve by a lever arrangement and may be of the type shown wherein a casing 60 encloses a bellows piston 61. As bleed air under pressure from conduit 17 enters casing 60, the bellows piston collapses and moves to the left, moving valve 15 in a closing direction. Orifice 62 is provided in the casing wall to relieve the pressure in the casing when control valve 18 is not functioning, and to prevent a pressure build-up in the system 16—17 which would tend either to keep valve 15 closed or render the actuator 16 sluggish in action. The force for spring-loading the flow valve 15 may be supplied by the bellows piston 61 alone, or it may be supplemented as well known in the art, by an additional spring operating in conjunction with the actuator levers, the bellows piston, or the butterfly shaft in the flow control valve 15.

A cooling air fan 19 is illustrated as being connected by shaft 20 to the cooling turbine 11 so as to be driven thereby. This fan serves the purpose of absorbing energy from the expansion of the compressed air passing through turbine 11 and also performs the function of drawing coolant air through the passages provided therefor in heat exchanger 12.

Control valve 18 is connected by means of pipes 21 and 22 to the air inlet to the cooling turbine 11 and to the pressurized cabin 10. The connection to conduit 14 is placed between flow valve 15 and heat exchanger 12, and may be a piezometer ring with several averaging static pressure taps, though any suitable static pressure connection may be employed.

Referring now to Fig. 2, control valve 18 comprises a housing 23, cover 24, base plate 25, diaphragm 26, and evacuated bellows assembly 27. Housing 23 is cylindrical in cross section and has a thick mid-sectional wall 28. This mid-sectional wall 28 is pierced with a central, axial aperture 29 through which passes connecting screw 30. A parallel orifice 31 is also provided therein which is opened or closed by means of spring-loaded needle or pilot valve 32 and which communicates, in turn, through radial orifice 33 with a radial pipe connection 34. This latter connection is used to supply controlled air under pressure through conduit 17 to pneumatic actuator 16.

Another radial pipe connection 35 is supplied in housing 23 to furnish a connection for pipe 21 which, as previously described, serves to connect control valve 18 with turbine inlet conduit 14.

Cover 24 is similarly cylindrical in cross section and may be secured to housing 23 by suitable means. This cover carries a pipe connection 36 which serves to connect control valve 18 to cabin 10 by means of pipe 22.

Diaphragm 26 is hermetically secured at the joint between housing 23 and cover 24. Connection to diaphragm 26 is made by plates 37, screw 30, and nut 38. The diaphragm may be molded of a flexible coated fabric or other suitable material which, while retaining appropriate flexibility, will still maintain the shape of the molded convolutions 39.

Bellows assembly 27 comprises metal spring bellows 40, cover 41, base washer 42, ratio control spring 43, master adjusting screw 44, pressure ratio adjusting nut 45, and lock nut 46. Bellows cover 41 is provided with an inwardly portruding boss 47 which is drilled out and threaded to receive the lower end of connecting screw 30. Spring 43 is provided to keep the bellows assembly expanded under at least atmospheric pressure and for a purpose presently to be explained. A tube 48 is provided in base washer 42 for the evacuation of the bellows assembly. Stud screw 44 is affixed and sealed to base washer 42 with solder or other suitable attaching means.

Base plate 25 is affixed to housing 23 and has associated therewith locking cap 49 and seal ring 50. Locking cap 49 is secured by screws 51 to the base plate and serves, in conjunction with seal ring 50, to hold adjusting nut 45 in close juxtaposition to the base plate 25.

As will now be evident, diaphragm 26 separates the interior of control valve 18 into two sealed chambers, a relatively low pressure chamber B in which is manifest cabin pressure, and a relatively high pressure chamber C in which is manifest turbine inlet pressure. The diaphragm and bellows assembly are connected together by connecting screw 30. The fixed end of the bellows is secured to base plate 25 by master adjusting screw 44, adjusting nut 45 and locking cap 49. The evacuated bellows is located inside the high pressure chamber C of the control valve assembly, hence the downward or collapsing force on the bellows is approximately proportional to this pressure. The force on the bellows exerted by the diaphragm through the rigid connection afforded by adjustment screw 30 is proportional to the pressure difference across the diaphragm. Thus, if, $P_1$ = Turbine inlet pressure (abs.)
$P_2$ = Cabin pressure (abs.)
$A_1$ = Effective area of diaphragm
$A_2$ = Effective area of bellows the net external force acting on the bellows may be expressed as $$F = P_1 A_1 - P_2 A_1 - P_1 A_2$$
$$= P_1(A_1 - A_2) - P_2 A_1 \quad \text{(Eq. 1)}$$

Under operating conditions, the lower end of needle valve 32 is either in contact with movable bellows cover 41 or is positioned very close thereto. Orifice 31 is closed and no air is allowed to pass to the pneumatic actuator 16. Considering $P_2$ (cabin pressure) as practically constant, as $P_1$ is increased, the upward force increases in proportion and the needle valve opens. Air bleeding past the needle valve exerts a pressure on the movable piston of the pneumatic actuator which, in turn, controls the position of the flow valve 15, opening or closing it to maintain the designed pressure ratio between the turbine inlet and the cabin.

Neglecting the relatively very small forces at the needle valve 32, the force F must be negative in character when the normal designed operating pressures are maintained in the chambers B and C. This force may then be considered as acting downwardly and is balanced by the upward thrust of the equivalent spring load, as represented by the combined spring rate K of the bellows 40 and bellows spring 43. Obviously force F must vary to some extent in order to lift the needle valve off its seat and this variation may be expressed as $$\Delta F = K \Delta s \quad \text{(Eq. 2)}$$

where K is defined above and $\Delta s$ is equal to the travel of the needle valve.

In order to maintain F as constant as may be possible in order to keep Equation 1 in its general straight line form, $\Delta F$ may be reduced to a negligible value by so designing the needle valve that a large change in the position of the piston of the pneumatic actuator will result from a very small needle travel. This condition is made possible since relatively high pressures are on one side of the needle valve and designedly relatively low pressures are needed to actuate the pneumatic actuator 16 and the flow valve 15.

Replacing F in Equation 1 by a constant C, that equation becomes:

$$C = P_1(A_1 - A_2) - P_2 A_1$$

or $$P_1 - \left[\frac{A_1}{A_1 - A_2}\right] P_2 - C_1 = 0 \quad \text{(Eq. 3)}$$

which, as previously noted, is now in the form of a general straight line equation for the co-ordinates $P_1$ and $P_2$ with the slope of the line being expressed as a function of the diaphragm and bellows areas and its position being a function of the constant C which latter value includes the factor K. The significance of these functions will be considered later in more detail.

Under normal operating conditions and with the pressure ratio control valve adjusted and calibrated for a given airplane and a given pressurization schedule for that airplane, the sequence of operations in starting from an inactive condition will now be described.

It is assumed for purposes of explanation that initially the airplane is on the ground, that the pressures throughout the system are sea-level atmospheric, and that flow valve 15 is open. Bellows 40 is collapsed; cover 41 is at the maximum set distance from needle valve 32; and diaphragm 26 is fully depressed. Upon starting the engine and compressor, the pressure in conduit 14 builds up, which condition is reflected in the starting up of turbine 11 and in the increase of pressure $P_1$ in chamber C. With the cabin pressure, and consequently the pressure in chamber B, remaining at atmospheric, diaphragm 26 slowly rises and, aided by bellows spring 43, pulls bellows cover 41 closer to the needle valve. This process continues until pressure $P_1$ reaches a normal value with relation to the cabin pressure $P_2$ which relative value, of course, is a function of the design, and the adjustment of the component parts of the control valve.

As the airplane takes off and ascends, all pressures drop uniformly but the pressure ratio either remains constant in accordance with the calibrated settings of the control valve or, more preferably, as will be more fully discussed later, is allowed to drop slowly, say from a value of 4.65 to 4.40. Any increase in $P_1$ or decrease in $P_2$ over and beyond the expected and designed values will cause the bellows cover 41 to contact and open needle valve 32. This allows pressurized air to bleed into the pneumatic actuator 16 and partly close flow valve 15 until the turbine inlet pressure is reduced to a value which will maintain the desired ratio between it and that in the cabin. When the airplane enters the isobaric range where the cabin pressure is maintained at a constant value, the pressure ratio is also maintained constant. When the airplane reaches the differential range where the cabin pressure is maintained at a fixed differential with atmospheric, the pressure ratio between the turbine inlet and the cabin may again be allowed to diminish with increasing altitude, though actual tests have indicated that the increase in speed of the turbine experienced between sea level and 5000 feet (due partly to the unloading of the cooling air fan 19 with decreasing air density) is much greater than that at higher altitudes.

The foregoing general explanation of the pressure ratio control problem was based on unpressurized operation. Since the objective of the pressure ratio control system is to avoid overspeeding, yet allow utilization of maximum pressure ratio at all altitudes, the ideal control was assumed to be one which maintained constant speed. To maintain constant speed when the load of the fan and the power from the turbine are both decreasing due to air density change as altitude increases, the adiabatic head across the turbine must remain approximately constant. Turbine adiabatic head varies with inlet absolute temperature and pressure ratio but the percentage change in absolute temperature with altitude change is small. Therefore, it was initially assumed that the ideal calibration of the pressure ratio control system was one of constant pressure ratio. Experimentation in flight soon proved that such was not the case and, to the contrary, it was found that the ideal calibration for any particular airplane is determined by its pressurization schedule and operating characteristics and generally calls for a diminishing pressure ratio with increase in altitude. Consequently, the design of the pressure ratio control system must allow for the adjustment of the slope of the pressure ratio curve as well as the pressure ratio level for the best compromise with the variations of speed due to the load mismatching of the turbine and fan in any particular installation.

Having determined the $P_1$ vs. $P_2$ slopes for various airplanes by observing the turbine speeds at various altitudes and conditions of operation, the desired curve of operation may be set up on the control valve which necessitates either a change in the slope of the $P_1$ vs. $P_2$ line expressed by Equation 3 or a raising or lowering of the curve to cover the required range of pressure ratios. These adjustments will be referred to as the slope adjustment and the pressure ratio adjustment respectively. They are made by means of the master adjusting screw 44 and the pressure ratio adjusting nut 45.

The slope is adjusted by loosening the lock nut 46 and holding the pressure ratio nut 45 from turning while rotating the master adjusting screw. This turns the bellows assembly, which thereupon moves up or down on connecting screw 30. This adjustment changes the operating position of the diaphragm which further results in a change in its effective area ($A_1$) due to the flexure and consequent change in configuration of the molded convolution 39. Referring to Equation 3, it can be seen that a change in slope is effected by a change in the effective diaphragm area. The change in diaphragm position affects both the effective diaphragm area $A_1$ and the spring load K which is included in Equation 3. However, the change of spring load is secondary to the change in slope coefficient $$\frac{A_1}{A_1 - A_2}$$

When the pressure ratio adjusting nut 45 is turned while master adjusting screw 44 is held from turning, the distance between the upper and lower ends of the bellows assembly is changed. This changes the spring load of the ratio control spring 43 inside the bellows which has the effect of changing K in Equation 3 and the position of the $P_1$ vs. $P_2$ line. Again, there is a secondary effect upon slope due to the increase in differential pressure across the diaphragm which has a further effect on its effective area.

From the above description, it should be noted carefully that the adjustment of either the slope or the position of the control curve requires manipulation of the two adjustment devices, but that the master adjusting screw changes the slope of the curve primarily, and the pressure ratio nut primarily bodily shifts the position of the curve.

While I have in this application specifically described a preferred embodiment which my invention may assume in practice from its system and valve mechanism aspects, it will be understood that this embodiment has been shown for purposes of illustration only, and that the inven-

What I claim as new and desire to secure by Letters Patent is:

1. In an aircraft air conditioning system including an expansion engine and a controllable flow valve in the inlet to said engine, an overspeed control for said engine comprising: means responsive to the pressures in the inlet and outlet of said engine; means responsive to the ratio between said inlet and outlet pressures; and means associated with said pressure ratio responsive means for controlling the position of said flow valve.

2. In an aircraft air conditioning system including an expansion engine and a controllable flow valve in the inlet to said engine, an overspeed control for said engine comprising: means responsive to the pressures in the inlet and outlet of said engine; means responsive to the ratio between said inlet and outlet pressures; and pneumatic means associated with said pressure ratio responsive means for controlling the position of said flow valve in a closing direction.

3. In an aircraft air conditioning system including an expansion engine and a normally open, controllable flow valve in the inlet to said engine, a pressure ratio control valve comprising: means responsive to the pressures in the inlet and outlet of said engine; means responsive to the ratio between said inlet and outlet pressures; pneumatic means associated with said pressure ratio responsive means for controlling the position of said flow valve; and adjustment means for regulating the responses of said pressure responsive and pressure ratio responsive means.

4. In an aircraft air conditioning system including an expansion engine and a normally open flow valve in the inlet to said engine, a pressure ratio control valve comprising: means responsive to the pressures in the inlet and outlet of said engine; means responsive to the ratio between said inlet and outlet pressures; means associated with said pressure ratio responsive means for controlling the position of said flow valve; and adjustment means for selectively regulating the responses of one or the other of said pressure responsive and pressure ratio responsive means.

5. In an aircraft air conditioning system including an expansion engine and a controllable flow valve in the inlet to said engine, a pressure ratio control valve comprising: means responsive to the pressures in the inlet and outlet of said engine; means responsive to the ratio between said inlet and outlet pressures; and pneumatic means associated with said pressure ratio responsive means for controlling the position of said flow valve; whereby said pressure ratio is caused to vary as an inverse function of the altitude of said aircraft.

6. In an aircraft air conditioning system including an expansion engine and a flow valve in the inlet to said engine, said flow valve being biased toward the normally open position, a pressure ratio control valve comprising: means responsive to the pressure in the inlet and outlet of said engine; means responsive to the ratio between said inlet and outlet pressures; and pneumatic means associated with said pressure ratio responsive means for applying a force to said flow valve in a closing direction, whereby said pressure ratio is caused to vary as a function of the altitude of said aircraft.

7. In an aircraft air conditioning system including an expansion engine and a normally open, spring-loaded, pneumatically actuated flow valve in the inlet to said engine, a pressure ratio control valve comprising: a housing; a flexible diaphragm dividing the housing into a low pressure chamber connected to the outlet of said engine and a high pressure chamber connected to the inlet of said engine; an evacuated spring-loaded bellows disposed in said high pressure chamber; an adjustable connection between said diaphragm and bellows; and means operatively associated with said bellows to admit air from said high pressure chamber to the pneumatically actuated flow valve whereby said flow valve may be moved in a closing direction.

8. In an aircraft air conditioning system including an expansion turbine and a flow valve in the inlet to said turbine, said flow valve having a pneumatic actuator, a pressure ratio control valve comprising: a housing; a flexible diaphragm dividing the housing into a low pressure chamber connected to the outlet of said turbine and a high pressure chamber connected to the inlet of said turbine; an evacuated spring-loaded bellows disposed in said high pressure chamber and adjustably secured to the base of said housing; an adjustable connection between said bellows and said diaphragm; and a spring-loaded valve carried by said housing and operatively associated with said bellows whereby when said bellows expands said needle valve opens and permits high pressure air to pass to the pneumatic actuator of said flow valve.

9. In an aircraft air conditioning system including an expansion engine and a positionable flow valve in the inlet to said engine, a pressure ratio control valve comprising: a housing; a flexible diaphragm separating said housing into a low pressure chamber connected to the outlet of said engine and a high pressure chamber connected to the inlet of said engine; an evacuated spring-loaded bellows in said high pressure chamber; a spring-loaded valve operated by said bellows whereby high pressure air may be bled to position said flow valve; an adjustment means associated with said diaphragm, said bellows, and the base of said housing whereby the effective area of said diaphragm may be varied.

10. In an aircraft air conditioning system including an expansion engine and a positionable flow valve in the inlet to said engine, a pressure ratio control valve comprising: a housing; a flexible diaphragm separating said housing into a low pressure chamber connected to the outlet of said turbine and a high pressure chamber connected to the inlet of said turbine; an evacuated spring-loaded bellows in said high pressure chamber; a spring-loaded valve operated by said bellows whereby high pressure air may be bled to position said flow valve; and adjustment means associated with said diaphragm, bellows, and housing whereby the spring load of said bellows may be varied.

11. A control for regulating the ratio between high and low fluid pressures, comprising: means sensitive to the differential between said pressures; means sensitive to the high pressure; a flow valve for controlling said high pressure; a fluid powered actuator for said flow valve; and pilot valve means operated by the differential and pressure sensitive means, for governing the admission of fluid to said actuator.

12. A control for regulating the ratio between fluid pressure upstream of a fluid operated device and fluid pressure downstream thereof, comprising: means sensitive to the differential between said pressures; means sensitive to the high pressure; a flow valve for controlling the flow of fluid to said device; actuating means for said flow valve; and pilot valve means operated by the differential and pressure sensitive means, for controlling the operation of said actuating means.

13. A control for regulating the ratio between fluid pressure upstream of a fluid operated device and fluid pressure downstream thereof, comprising: means sensitive to the differential between said pressures; means sensitive to the high pressure; a flow valve for controlling the flow of fluid to said device; a fluid pressure operable actuator for said flow valve; and pilot valve means operated by the differential and pressure sensitive means, for governing the admission of fluid to said actuator.

RICHARD A. FISCHER.

REFERENCES CITED

The following references are of record in the file of this patent:

UNITED STATES PATENTS

| Number | Name | Date |
|---|---|---|
| 2,484,846 | Paget | Oct. 18, 1949 |
| 2,484,850 | Paget | Oct. 18, 1949 |
| 2,498,633 | Arthur | Feb. 28, 1950 |